United States Patent
Ojha et al.

(10) Patent No.: US 7,024,371 B2
(45) Date of Patent: *Apr. 4, 2006

(54) HIGH AVAILABILITY PLANNING AND SCHEDULING ARCHITECTURE

(75) Inventors: Subhasis Ojha, Mississauga (CA); Rickey T. Tom, Burlington (CA); Abhijit A. Bhide, Irving, TX (US); Arvindh Murugan, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 956 days.

This patent is subject to a terminal disclaimer.

(21) Appl. No.: 09/835,003

(22) Filed: Apr. 13, 2001

(65) Prior Publication Data

US 2002/0152103 A1   Oct. 17, 2002

(51) Int. Cl.
*G06F 17/60* (2006.01)
(52) U.S. Cl. .............................. 705/8; 700/99
(58) Field of Classification Search .................. 705/8
See application file for complete search history.

(56) References Cited

U.S. PATENT DOCUMENTS

| | | | |
|---|---|---|---|
| 4,209,845 A | 6/1980 | Berger et al. | 364/900 |
| 4,611,280 A | 9/1986 | Lindermann | 364/300 |
| 4,611,310 A | 9/1986 | Durbin | 365/230 |
| 4,737,910 A | 4/1988 | Kimbrow | 364/403 |
| 4,827,423 A | 5/1989 | Bealsey et al. | 364/468 |
| 4,992,940 A | 2/1991 | Dworkin | 364/401 |
| 5,041,972 A | 8/1991 | Frost | 364/401 |
| 5,089,970 A | 2/1992 | Lee et al. | 364/468 |
| 5,101,352 A | 3/1992 | Rembert | 364/401 |
| 5,128,861 A | 7/1992 | Kagami et al. | 364/403 |
| 5,148,370 A | 9/1992 | Litt et al. | 364/468 |
| 5,175,857 A | 12/1992 | Inoue | 395/800 |
| 5,216,612 A | 6/1993 | Cornett et al. | 364/468 |
| 5,218,700 A | 6/1993 | Beechick | 395/700 |
| 5,231,567 A * | 7/1993 | Matoba et al. | 700/100 |

(Continued)

FOREIGN PATENT DOCUMENTS

EP   0 025 405   5/1980

(Continued)

OTHER PUBLICATIONS

Web.archive.org's MAPICS.com webpage of Feb. 29, 2000, "technology AS/400e".*

(Continued)

*Primary Examiner*—Tariq R. Hafiz
*Assistant Examiner*—Jonathan G. Sterrett
(74) *Attorney, Agent, or Firm*—Brian E. Harris; James E. Walton

(57) ABSTRACT

A high availability planning and scheduling system includes a number of high availability (HA) systems (20) that are coupled to one or more external systems (40) using a message bus (50). Each HA system (20) includes an HA server (24) that receives and queues requests received from the external systems (40). Each HA system (20) also includes an advanced planning and scheduling (APS) engine (22) that receives a request from the HA server (24) and processes the request using planning information stored in memory of the HA system (20). Furthermore, the APS engine (22) also modifies the planning information according to the processing of the request and generates a response to the external system (40) from which the request originated. The high availability planning and scheduling system further includes a message manager (54) that directs each request received from the external systems (40) to an appropriate HA system (20) using the message bus (50).

27 Claims, 6 Drawing Sheets

U.S. PATENT DOCUMENTS

| | | | |
|---|---|---|---|
| 5,233,533 A | 8/1993 | Edstrom et al. | 364/468 |
| 5,237,496 A | 8/1993 | Kagami et al. | 364/401 |
| 5,280,425 A | 1/1994 | Hogge | 364/402 |
| 5,303,144 A | 4/1994 | Kawashima et al. | 364/401 |
| 5,305,199 A | 4/1994 | LoBiondo et al. | 364/403 |
| 5,321,833 A | 6/1994 | Chang et al. | 395/600 |
| 5,343,388 A | 8/1994 | Wedelin | 364/402 |
| 5,369,570 A | 11/1994 | Parad | 364/401 |
| 5,440,479 A | 8/1995 | Hutton | 364/401 |
| 5,570,291 A | 10/1996 | Dudle et al. | 364/268.01 |
| 5,594,639 A | 1/1997 | Atsumi | 364/468.14 |
| 5,630,070 A | 5/1997 | Dietrich et al. | 395/208 |
| 5,712,985 A | 1/1998 | Lee et al. | 395/207 |
| 5,712,989 A | 1/1998 | Johnson et al. | 395/228 |
| 5,715,444 A | 2/1998 | Danish et al. | 395/604 |
| 5,734,890 A | 3/1998 | Case et al. | 395/605 |
| 5,758,329 A | 5/1998 | Wojcik et al. | 705/28 |
| 5,765,143 A | 6/1998 | Sheldon et al. | 705/28 |
| 5,809,144 A | 9/1998 | Sirbu et al. | 380/25 |
| 5,809,477 A * | 9/1998 | Pollack | 705/3 |
| 5,826,260 A | 10/1998 | Byrd, Jr. et al. | 707/5 |
| 5,845,258 A | 12/1998 | Kennedy | 705/8 |
| 5,873,076 A | 2/1999 | Barr et al. | 707/3 |
| 5,918,213 A | 6/1999 | Bernard et al. | 705/26 |
| 5,946,210 A | 8/1999 | Montminy et al. | 364/468.03 |
| 5,960,414 A | 9/1999 | Rand et al. | 705/28 |
| 5,963,920 A | 10/1999 | Rose et al. | 705/28 |
| 5,963,953 A | 10/1999 | Cram et al. | 707/102 |
| 5,970,474 A | 10/1999 | LeRoy et al. | 705/27 |
| 5,979,757 A | 11/1999 | Tracy et al. | 235/383 |
| 5,993,041 A * | 11/1999 | Toba | 700/99 |
| 5,995,947 A | 11/1999 | Fraser et al. | 705/38 |
| 5,999,908 A | 12/1999 | Abelow | 705/1 |
| 6,009,406 A | 12/1999 | Nick | 705/10 |
| 6,009,407 A | 12/1999 | Garg | 705/10 |
| 6,012,041 A | 1/2000 | Brewer et al. | 705/28 |
| 6,012,051 A | 1/2000 | Sammon, Jr. et al. | 706/52 |
| 6,016,504 A | 1/2000 | Arnold et al. | 709/200 |
| 6,035,305 A | 3/2000 | Strevey et al. | 707/104 |
| 6,049,777 A | 4/2000 | Sheena et al. | 705/10 |
| 6,055,519 A | 4/2000 | Kennedy et al. | 705/80 |
| 6,064,980 A | 5/2000 | Jacobi et al. | 705/26 |
| 6,085,165 A | 7/2000 | Ulwick | 705/7 |
| 6,085,170 A | 7/2000 | Tsukuda | 705/26 |
| 6,115,690 A * | 9/2000 | Wong | 705/7 |
| 6,119,102 A * | 9/2000 | Rush et al. | 705/29 |
| 6,151,582 A * | 11/2000 | Huang et al. | 705/8 |
| 6,167,380 A | 12/2000 | Kennedy et al. | 705/10 |
| 6,167,383 A | 12/2000 | Henson | 705/26 |
| 6,188,989 B1 | 2/2001 | Kennedy | 705/8 |
| 6,195,652 B1 | 2/2001 | Fish | 707/2 |
| 6,226,652 B1 | 5/2001 | Percival | 707/203 |
| 6,249,774 B1 | 6/2001 | Roden et al. | 705/28 |
| 6,272,389 B1* | 8/2001 | Dietrich | 700/101 |
| 6,321,133 B1 | 11/2001 | Smirnov et al. | 700/100 |
| 6,324,522 B1 | 11/2001 | Peterson et al. | 705/28 |
| 6,356,797 B1* | 3/2002 | Hsieh et al. | 700/101 |
| 6,405,308 B1 | 6/2002 | Gupta et al. | 713/1 |
| 6,463,345 B1 | 10/2002 | Peachey-Kountz et al. | 700/99 |
| 6,484,165 B1 | 11/2002 | Beall et al. | 707/3 |
| 6,505,172 B1 | 1/2003 | Johnson et al. | 705/27 |
| 6,519,648 B1 | 2/2003 | Eyal | 709/231 |
| 6,567,820 B1 | 5/2003 | Scheifler et al. | 707/103 |
| 6,601,043 B1 | 7/2003 | Purcell | 705/26 |
| 6,609,101 B1* | 8/2003 | Landvater | 705/10 |
| 6,826,538 B1* | 11/2004 | Kalyan et al. | 705/7 |
| 2001/0044769 A1 | 11/2001 | Chavez | 705/37 |
| 2001/0047285 A1 | 11/2001 | Borders | 705/8 |
| 2002/0013721 A1 | 1/2002 | Dabbiere et al. | 705/7 |
| 2002/0019761 A1 | 2/2002 | Lidlow | 705/10 |
| 2002/0029168 A1 | 3/2002 | McConnell Jr., et al. | 705/26 |
| 2002/0049622 A1 | 4/2002 | Lettich et al. | 705/7 |
| 2002/0082931 A1 | 6/2002 | Siegel et al. | 705/26 |

FOREIGN PATENT DOCUMENTS

| | | |
|---|---|---|
| EP | 0 231 552 | 12/1986 |
| EP | 0 425 405 | 5/1991 |
| EP | 0 463616 | 6/1991 |
| EP | 0 466 089 | 7/1991 |
| EP | 0 466 090 | 7/1991 |
| EP | 0 615 198 | 9/1994 |
| GB | 2 293 902 | 4/1996 |
| WO | WO 00/17795 | 3/2000 |

OTHER PUBLICATIONS

Web.archive.org's MAPICS.com webpage of Nov. 9, 1999, "Future Directions".*
Web.archive.org's MAPICS.com webpage of Nov. 5, 1999, "Products Overview".*
Web.archive.org's MAPICS.com webpage of Nov. 4, 1999, "Products Demand".*
Web.archive.org's MAPICS.com webpage of Nov. 5, 1999, "Resource Planning".*
Bruce Wassell's www-919.ibm.com webpage copyrighted Mar., 1999, "MQSeries for AS/400 V5.1".*
Web.archive.org's MAPICS.com webpage of Apr. 16, 2000, "MAPICS XA Product Family".*
BusinessWire, May 25, 1999, "DataMirror High Availability Suite wins in IBM Powered by AS/400E Program".*
Web.archive.org's DataMirror.com webpage of Feb. 10, 1999, "High Availability Suite".*
Web.archive.org's DataMirror.com webpage of Dec. 6, 1998, "DataMirror Products".*
Web.archive.org MAPICS.com webpage of Feb. 29, 2000, "news Announcements: Energized for e-business eWorkplace and Your Future".*
Web.archive.org MAPICS.com webpage of Nov. 8, 1999, "The AS/400—The Preferred MAPICS Platform".*
Web.archive.org MAPICS.com webpage of Jan. 23, 2000, "Building Productivity throughout the Enterprise".*
Web.archive.org MAPICS.com webpage of Nov. 5, 1999, "Products Financial".*
Web.archive.org MAPICS.com webpage of Nov. 4, 1999, "Products Engineering".*
Web.archive.org MAPICS.com webpage of Nov. 5, 1999, "Products Operations".*
Web.archive.org MAPICS.com webpage of Feb. 19, 1999, "Customers Success—York International Denmark".*
Web.archive.org MAPICS.com webpage of Oct. 5, 1999, "Customers Success—Weber Aircraft".*
Web.archive.org MAPICS.com webpage of Feb. 19, 1999, "Customers Success—Volvo Construction Equipment Sweden".*
Web.archive.org MAPICS.com webpage of Feb. 22, 1999, "CustomersSuccess—Timesavers, Inc.".*
Web.archive.org MAPICS.com webpage of Mar. 5, 2000, "Customers Success—Tech International Ohio".*
Web.archive.org MAPICS.com webpage of May 6, 1999, "Customers Success—Sanyo Energy Germany".*
Web.archive.org MAPICS.com webpage of Oct. 4, 1999, "Customers Success—Dialight Corporation".*
Web.archive.org MAPICS.com webpage of Aug. 31, 1999, "News EuroMAPICS".*
SAP Info, Jan. 17, 2001, "Logistics Masterplan", pp. 1-2.*
Canadian News, Jun. 23, 1999, "DataMirror the first to deliver new cluster management solution for IBM AS/400", pp. 1-3.*

Web.archive.org XML.com webpage of Apr. 24, 1999, "CSS, XSL and other style sheet and presentation issues".*
IBM, inc.'s presentation of Oct. 3, 2000, "IBM eServer iSeries 400 . . . for Extreme Business" 38 slides.*
Paula Richard's (IBM) presentation of Apr. 13, 2000, "AS/400 and JAVA: Update", 70 slides, "http://www.common.be/pdffiles/13042000AS400JavaUpdate.PDF".*
Johnston, Sam, Sep. 1997, "Communicating with Sam—Disaster Recovery and High Availability". Toronto Users Group for Midrange Systems, vol. 13, No. 1, pp. 1-3.*
Harter, Charlie, Sep. 1997, "Why you should web-enable your AS/400". Toronto Users Group for Midrange Systems, vol. 13, No. 1, pp. 1-3.*
Web.archive.org cmssoftware.com webpage of Sep. 1, 1999, "Order Processing/Customer Service".*
Allen, Supply Chain Management Software, May 1998, University of Texas, Austin http://esallen.home.mindspring.com/erp.SCH.htm.
Available to Promise (ATP) http://sandbox.aiss.uiuc.edu/oracle/nca/mrp.atp.htm, unknown.
Anonymous, "Concentra and i2 Technologies to Integrate Sales Configuration with Global Supply Chain Management; Project Configuration Recognized as Critical . . . ," Business Wire, Oct. 10, 1995 (2 pages).
Anonymous, MRP upstaged One Trend in the Software Industry is that the Top Enterprise-Resource-Planning Software Companies are Outright Supplanting the Core Planning functions of their manufacturing-resource planning: MRP III, Industry Week, v. 246, n. 3, Feb. 3, 1997, 3 pages.
Anonymous, "Intellingent Manufacturing Report", Intelligent Manufacturing, vol. 1, No. 3, 3 pages, Mar. 1995.
carmax.com, webpages dated prior to Mar. 2, 2001 retrieved from archive.org, 10 pages, unknown.
Cavallaro, Dialog file 621 (Gale Group New Prod. Annou. (R)), No. 1007808, "New Para Research MRP II System Adapts Itself to your Business", PR Newswire, 4 pages, Aug. 13, 1995.
Castagna, "A Model for Evaluating Manufacturing System Time by Performances," Integrated Manufacturing System, vol. 3, No. 3, pp. 15-21, 1992.
Davis, "Tough Customers," Manufacturing Systems, Wheaton, 6 pages, Nov. 1994.
Funaki, et al., "Method and System for Production Planning Transaction," JP02001331693A, EAST Version 1.03.0002, 58 pages, Apr. 9, 2002.
Foxlow "Knowledge-Based Manufacturing: The Key to Recover", Logistics Information Management vol. 7, No. 4, pp. 23-26, 1994.
Greene, "MRP II: Out with the Old . . . ; Available: Real-Time EDI, Multiplant Functions, More; MRP II Software Systems; How to Negotiate the Right Price," Computerworld, Framingham, 7 pages, Jun. 8, 1992.
Hammel, et al, y chain, Production and Inventory Management Journal, Second Quarter, Duns: 00-912-2532, ISSN 08978336, 9 pages, http://proquest.umi.com/pqdweb?TS=989416 &Fmt=3&Sid=9&Idx=28&deli=I&RQT=309&Dtp=1, 1993 Printed out May 9, 2001.
Jasany, "Cut Costs with Integrated Software" Automation, Oct. 1987, vol. 34, No. 10, p. 62.
Morton, "The uses of time," The Economist, London, V. 330, Issue 7853, 4 pages, Mar. 5, 1994.
McClelland Using Simulation to Facilitate Analysis of Manufacturing Strategy, Journal of Business Logistics, vol. 13, No. 1, pp. 215-237, 1992.
McClutcheon et al. "The Customization-Responsiveness Squeeze," Sloan Management Review, vol. 35, No. 2, pp. 89-99, Wint. 1994.
Parker, Demand Management and Beyond Supplement pp. 2A-14A, Jun. 1996.
Parker, What New Tools will Best Save Time, Manufacturing Systems, Wheaton, vol. 12, Issue 1, 6 Pages, Nov. 1991.
Rhodes, Dusty, "The Keys to the Enterprise: Integrated Applications Drive Information Systems to New Horizons," HP Professional, vol. 5, No. 11, pp. 44-46, Nov. 1991, Jun. 11, 1990.
Smith, Frank, "Dun & Bradstreet Software Delivers Sales and Promotion System Manufacturer," Bussiness Wire, s 1, p. 1, Jun. 11, 1990, 1998.
SAP Annual Report—1998, SAP Ag. http://www.sap-ag.de/company/investor/reports/ar_onlin/1998/init_e.asp, 1998.
Unknown, "Rhythm," a series of i2 Technologies' web pages, http://web.archive.org/web/19980526040159/http://www.i2.com/, 23 pages, Apr. 23, 1998.

* cited by examiner

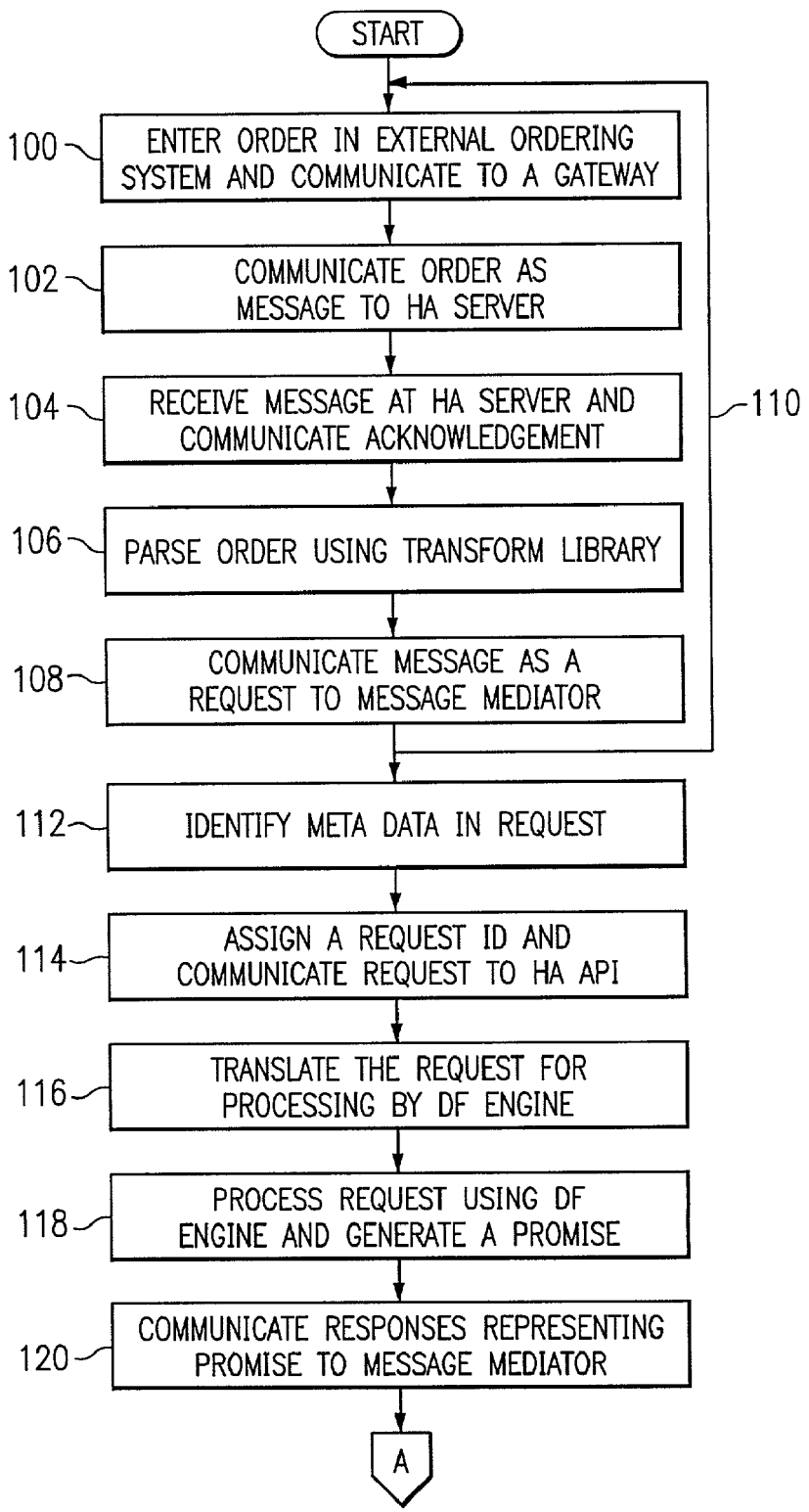

HIGH AVAILABILITY PLANNING AND SCHEDULING ARCHITECTURE

CROSS-REFERENCE TO RELATED APPLICATION

This application is related to U.S. application Ser. No. 09/834,836 entitled "Synchronization of Planning Information in a High Availability Planning and Scheduling Architecture," which was filed on Apr. 13, 2001.

TECHNICAL FIELD OF THE INVENTION

This invention relates to the field of planning and scheduling and more particularly to a high availability planning and scheduling architecture.

BACKGROUND OF THE INVENTION

Since product manufacturing and distribution facilities have a finite production and inventory capacities, planning for and managing customer orders and other requests is a fundamental activity performed by most manufacturing and distribution organizations. To better meet customer demand, a manufacturer may typically manufacture products before receiving customer orders. This production is typically based on forecasts of future customer demand. The supply of a product that is produced based on a demand forecast may be referred to as "available-to-promise" (ATP) supply. ATP supply consists of quantities of one or more products each having an associated date on which the products are scheduled to be available for delivery to a customer.

Once future demand has been forecasted, a plan to fulfill this demand (for example, using ATP supply) can be formulated by an appropriate planning engine. When an actual customer request is received, one or more promises may be made to the customer by a demand fulfillment engine regarding fulfillment of the request. The demand fulfillment engine typically has access to ATP supply information and can promise ATP supply to the customers to meet their demand. If a manufacturer or distributor is to satisfy its customers, it is often important that this demand fulfillment function be provided to the customers on a continuous basis without any interruptions in service. If uninterrupted demand fulfillment is not provided, a product manufacturer or distributor risks losing its customers to a competitor.

SUMMARY OF THE INVENTION

According to the present invention, disadvantages and problems associated with previous planning and scheduling systems and methods have been substantially reduced or eliminated.

According to one embodiment of the present invention, a high availability planning and scheduling system includes a number of high availability (HA) systems that are coupled to one or more external systems using a message bus. Each HA system includes an HA server that receives and queues requests received from the external systems. Each HA system also includes an advanced planning and scheduling (APS) engine that receives a request from the HA server and processes the request using planning information stored in memory of the HA system. Furthermore, the APS engine also modifies the planning information according to the processing of the request and generates a response to the external system from which the request originated. The high availability planning and scheduling system further includes a message manager that directs all requests received from the external systems to a single HA system using the message bus.

Particular embodiments of the present invention may provide one or more important technical advantages. For example, embodiments of the present invention provide an architecture that provides fault tolerant, real-time communication between a number of APS engines and one or more external systems. Certain embodiments of the present invention provide multiple APS engines that are in communication with one another such that if one APS engine fails or otherwise becomes unavailable, another APS engine can seamlessly take over for the unavailable APS engine. Furthermore, the multiple APS engines allow for load balancing through assignment of different types of requests to different APS engines and/or allocation of multiple requests of a particular type between multiple APS engines.

Particular embodiments also support the transformation of requests from external systems as appropriate for a particular APS engine and/or the transformation of responses from an APS engine as appropriate for a particular external system. Therefore, the manner in which the APS engines and the external systems output information may not need to be specially configured before these components are included in the architecture of the present invention. Furthermore, particular embodiments of the present invention provide a mechanism by which the planning information stored in the APS engines (which is used to respond to requests from external system) may be updated while still providing uninterrupted service to the external systems.

Other important technical advantages are readily apparent to those skilled in the art from the following figures, description and claims.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A and 2B illustrates an exemplary method of processing product orders;

DETAILED DESCRIPTION OF THE INVENTION

Figure 1:
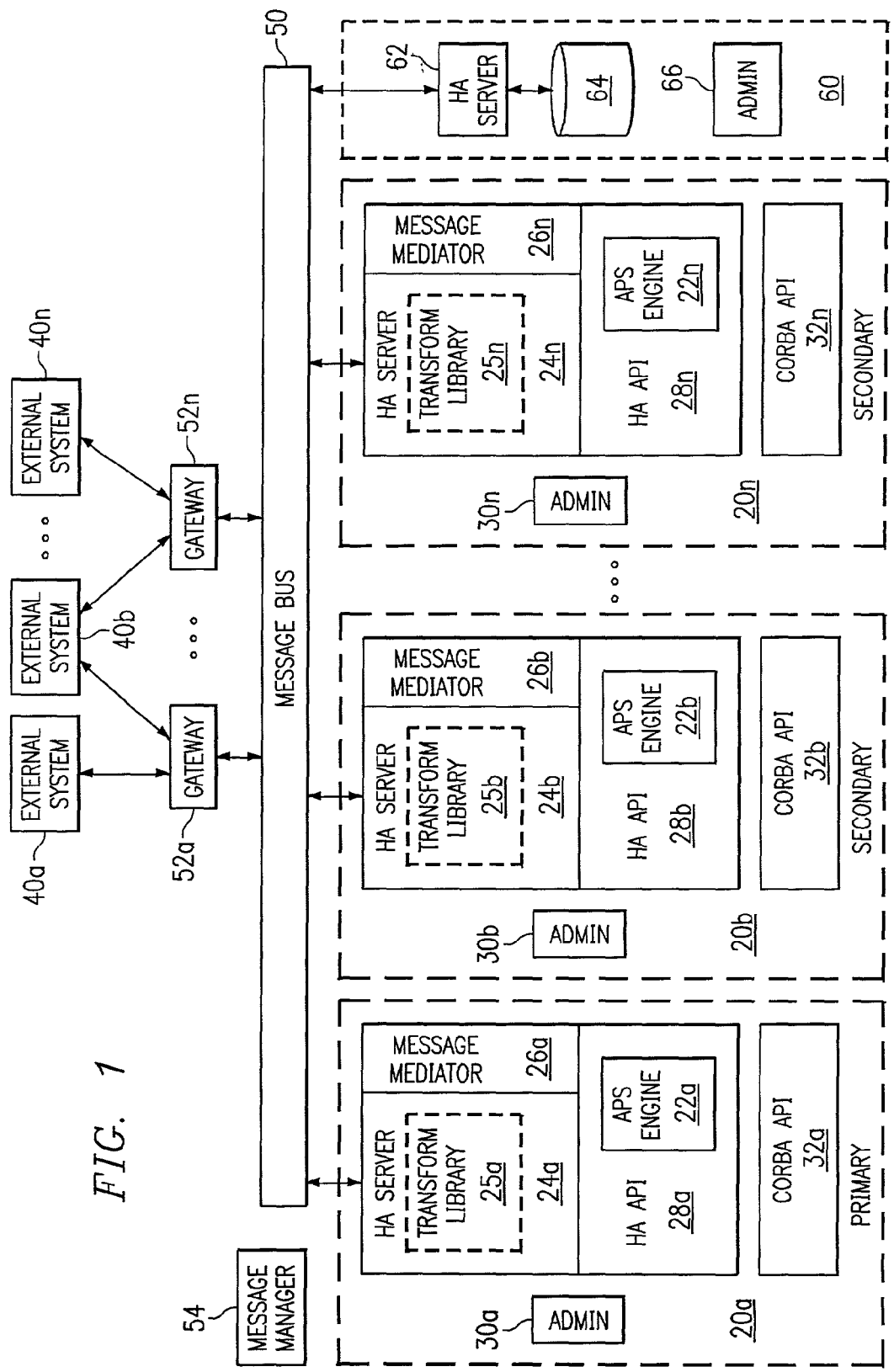
FIG. 1 illustrates an exemplary high availability planning and scheduling architecture.

FIG. 1 illustrates an exemplary high availability (HA) planning and scheduling architecture 10. Architecture 10 includes one or more HA systems 20 that communicate with one or more external systems 40 to provide advanced planning and scheduling (APS) services to users of external systems 40. HA systems 20 are coupled and share information in a manner that allows them to collectively provide fault-tolerant, real-time APS services to users of external system 40. In a particular embodiment, a primary HA system 20a provides primary services to external systems 40, and one or more redundant secondary HA systems 20b–20n provide secondary services to external systems 40 (for example, to alleviate the load on primary HA system 20a). One or more secondary HA systems 20b–20n may provide the primary services to external systems 40 (and thus assume the role of the primary HA system 20a) if the operation of primary HA system 20a is interrupted. As described below, primary HA system 20a communicates appropriate information to secondary HA systems 20b–20n as system 20a is providing the primary services to external system 40 such that secondary HA systems 20a–20n may seamlessly replace primary HA system 20a in the event of its failure or other unavailability.

In addition to providing redundant HA systems 20 for fault protection, the architecture 10 also provides for a controlled changeover between different groups of HA systems 20. Each HA system group includes a primary HA system 20a and one or more secondary HA systems 20b–20n. As described below, an operating HA system group may be replaced by a replacement HA system group so that ATP supply, customer order, or other information stored by the operating HA system group may be updated (or for any other appropriate reason). To accomplish such a changeover, architecture 10 includes a database system 60 that stores information regarding the state of the operating HA systems 20 and services that have been and are being performed by the operating HA systems 20. Therefore, one or more replacement HA systems 20 in the replacement HA system group may access database system 60 to obtain information necessary to perform the changeover. The operating and replacement HA systems 20 may then communicate to effect the changeover.

Although "high availability" is discussed in describing architecture 10 and systems 20, architecture 10 and systems 20 need not necessarily provide a particular level of availability (e.g., "five nines" or 99.999 percent availability). The present invention contemplates any suitable level of substantially continuous availability being provided. Moreover, the present invention is intended to encompass architectures and systems that seek to achieve such substantially continuous availability, whether or not it is actually achieved in a particular implementation.

HA systems 20 (both primary and secondary) each include APS engine 22 that receives requests from one or more external systems 40 and responds to the requests in an appropriate manner. APS engine 22 may provide any appropriate planning, scheduling, logistics, forecasting, fulfillment, management, and/or other related services to external systems 40. In the exemplary embodiments described below, HA systems 20 each include a demand fulfillment (DF) engine 22 that receives orders for products or other items from external ordering systems 40, evaluates the available supply of the items that may be used to fulfill the orders (the amounts of the items that are "available to promise" or ATP), and returns promises to external ordering systems 40 regarding the fulfillment of the orders. However, it will be understood from the following description that architecture 10 of the present invention may be used with any other appropriate type of APS engine 22 for which continuous or at least substantially continuous availability is desired. In such embodiments, DF engine 22 may be replaced in HA systems 20 by another suitable APS engine 22.

Each HA system 20 includes components in addition to APS engine 22 that are used to provide services to external systems 40. A message bus 50 enables the communication of messages between external ordering systems 40, HA systems 20, and database system 60. Message bus 50 may be implemented using any appropriate wireline or wireless communication technique. For example, in a particular embodiment, message bus 50 may include a portion of the Internet. Each external system 40 is coupled to one or more gateways (or HA clients) 52 that serve as an interface between external systems 40 and message bus 50. In a similar manner, HA servers 24 serve as an interface between the other components of HA systems 20 and message bus 50. A similar HA server 62 serves as an interface between database 64 of database system 60 and message bus 50. A message daemon or other appropriate messaging manager 54 directs messages communicated over message bus 50 to one or more appropriate HA servers 24 and notifies HA servers 24 of the existence of messages. For purposes of simplicity, much of the description below assumes that HA servers 24 receive messages directly from and communicate messages directly to gateways 52 using message bus 50. However, it should be understood that this communication may be enabled using message manager 54 (and possibly an associated daemon or other manager at each HA system 20) to appropriately direct messages from external systems 40 to HA systems 20 and vice versa.

HA servers 24 receive and queue incoming messages from message bus 50 and perform any appropriate manipulation of the format of the messages. Likewise, HA servers 24 may manipulate messages from APS engine 22 that are to be communicated to external systems 40. To perform such manipulations, HA servers 24 may include a transform library 25 that is capable of re-packaging received messages into a format that can be interpreted by the component to which the message is to be communicated. Transform library 25 includes information regarding the appropriate format for external systems 40 and for APS engine 22, which may be updated if the type of external system 40 or APS engine 22 changes. Therefore, in one embodiment, APS engine 22 and external systems 40 do not need to be specially configured to send messages in a particular format.

HA systems 20 may also include a message mediator 26 that provides an interface between HA server 24 and an HA application program interface (API) 28. Message mediator 26 may receive queued messages from HA server 24, determine the types of operations requested in the messages, assign identifiers (IDs) to the requests, and queue the requests in an engine queue associated with APS engine 22. HA API 28 may than retrieve requests from the engine queue and translate the requests for processing by the associated APS engine 22. The functions and operation of HA server 24, message mediator 26, and HA API 28 are described in further detail below. However, it should be understood that although these exemplary components are described and illustrated, one or more other appropriate components may replace, combine, or cooperate with these components to enable communication of messages between external systems 40 and APS engines 22 of one or more HA systems 20.

HA systems 20 may include an administration tool 30 that is used by a system administrator to monitor the activity of HA system 20. Database system 60 may include a similar administration tool 66. Similarly, a Common Object Request Broker Architecture (CORBA) API 32a or other appropriate interface may be provided to allow an administrator to access data associated with APS engine 22a or any other appropriate component(s) of HA system 20. The various components of HA systems 20 and database system 60 may be implemented using any appropriate combination of hardware and/or software operating at one or more locations. Furthermore, the HA systems 20 in a particular HA system group may be located in one or more locations, and different HA system groups may be located in the same or different locations. In addition, external systems 40 may be located remotely from HA systems 20 and database system 60, as would typically be the case when message bus 50 incorporates the Internet.

As described above, certain embodiments of HA systems 20 include DF engines 22 that provide demand fulfillment services to external ordering systems 40. External ordering systems 40 may include any suitable systems that may be used to communicate requests to HA systems 20. For example, external ordering systems 40 may be used by customers to submit orders, inquiries, or other requests. A product orders is typically a request by a customer for a promise of product delivery, consistent with the order, from the entity associated with HA systems 20. Therefore, DF engines 22 are typically able to determine the supply of a product that is available to meet the customer order (the ATP supply) and to return a promise to the customer as to when its order can be fulfilled. DF engines 22 may also respond to customer inquiries, such as requests for quotations, regarding the availability of a certain product (for example, on a particular date, at a particular price, and at a particular location).

DF engines 22 may be used in conjunction with one or more demand planning engines. These demand planning engines may perform master demand planning that determines what demand has been committed to (what product orders have been promised) over a certain time horizon and determines the amount of supply that is ATP during this time horizon. Such a determination may be made using information about the manufacturing process used to create the product, the supply chain supporting this manufacturing process, and/or any other appropriate information. As an example only, master demand planning may be performed at the end of each day to determine the amount of supply that is ATP for the next day (the ATP supply). However, the ATP supply may be determined at any other appropriate time intervals.

In certain embodiments, the ATP supply information is communicated to DF engine 22 in each HA system 20 in an HA system group before that system group goes on-line to become the operating HA system group. The ATP supply information may be stored by each HA system 20 in an associated memory or other appropriate data storage device. ATP supply information may also be stored in database 64 or any other appropriate remote location; however, each HA system 20 preferably uses locally stored, in-memory ATP supply information to improve the processing time associated with each transaction. HA systems 20 use this ATP supply information to process product orders, inquiries, and any other appropriate requests from external ordering systems 40.

As described above, in particular embodiments, primary HA system 20a is responsible for providing primary services to the external systems 40 and secondary HA systems 20b–20n are responsible for providing secondary services and fault protection. As an example only, the primary services provided by primary HA system 20a with an associated DF engine 22a may include processing customer orders for products from external ordering systems 40 and generating promises in response to these orders. In general, the primary services involve transactions that change the state of an HA system 20. For example, a promise generated by primary HA system 20a that allocates a certain amount of the ATP supply to a customer is a state-changing transaction since the ATP supply has changed and needs to be updated. Such state-changing transactions are significant, particularly in embodiments where such information is stored locally at each HA system 20, in that the ATP supply information (or other state information that is changed) needs to be updated at each HA system 20. As described below, primary HA system 20a replicates such state change information to secondary HA systems 20b–20n after completing a state-changing transaction. The performance of state-changing services may be limited to the primary HA system 20a to prevent multiple HA systems 20 from simultaneously changing the ATP supply and communicating such changes to one another.

Secondary services provided by secondary HA systems 20b–20n may include processing customer inquiries and generating responses to the inquiries (in addition to providing fault protection in the event primary HA system 20a fails or otherwise becomes unavailable). In general, the secondary services do not involve state changing transactions. For example, generating a response to an inquiry about the available supply does not require replication of data between HA systems 20 since there is no state change. Such inquiries may be automatically routed to secondary HA systems 20b–20n, leaving primary HA system 20a free to handle product orders and other state-changing requests. However, since secondary HA systems 20b–20n include the same or similar components as primary HA system 20a, one of the secondary HA systems 20b–20n may become the primary HA system 20a in the event the primary HA system 20a fails. In such a case, inquiry processing and other secondary services may be performed by the remaining secondary HA systems 20b–20n.

Figure 2B:
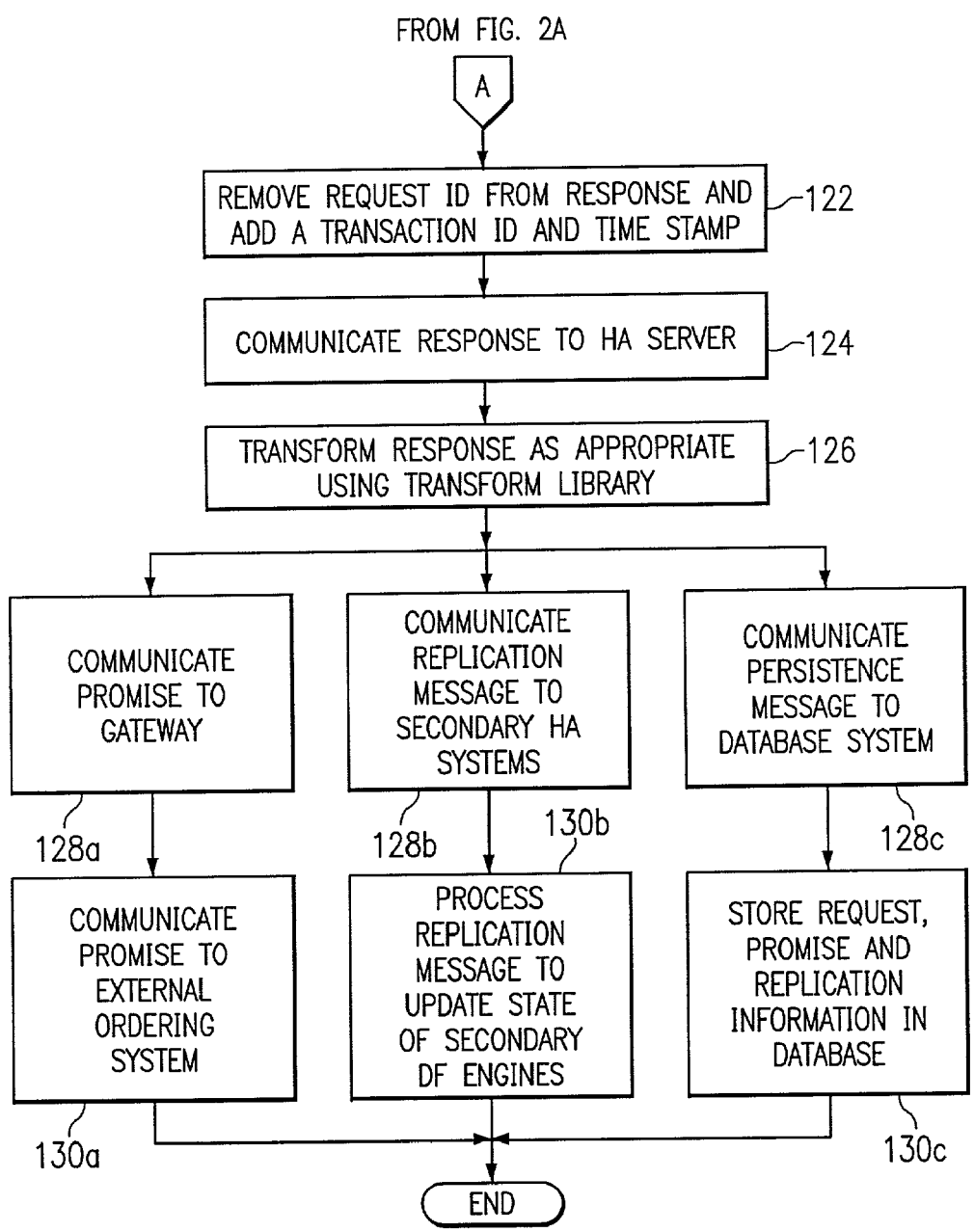

FIGS. 2A and 2B illustrates an exemplary method of processing orders using architecture 10. Though product orders are primarily described, the present invention contemplates orders for any suitable items. The method begins at step 100, where a product order is entered into an order management system 40 and communicated to an appropriate gateway 52. The order may be a request for a particular number of products on a particular date. At step 102, gateway 52 communicates the order as a request using message bus 50. As described above, primary HA system 20a may be used to process state-changing requests, such as product orders. Therefore, message manager 54 may direct state-changing requests to HA server 24a of primary HA system 20a. However, any HA system 20 may be used in other embodiments. HA server 24a receives the request at step 104 and preferably communicates an acknowledgement to gateway 52 using message bus 50.

HA server 24a uses transform library 25a at step 106 to parse the incoming order to examine the order for size and special characters, and communicates the order as a request to message mediator 26a at step 108 (the request may be "communicated" by placing the order in an internal request queue). HA server 24a then returns to receive other messages from gateways 52 at step 100, as indicated by arrow 110. At step 112, message mediator 26a retrieves the request from the request queue (or otherwise receives the request) and identifies metadata in the request. The metadata includes parameterized operations that external ordering systems 40 can potentially invoke within a DF engine 22 using architecture 10. Therefore, the metadata includes information regarding the semantics that should be used to communicate data to and obtain data from an HA server 24a. In addition, the metadata may include parameters or tokens that inform HA server 22a to communicate with HA servers 24b–24n of secondary HA systems 20b–20n for replication of information and with HA server 62 of database system 60 for persistent storage of information.

At step 114, message mediator 26*a* attaches an internal request ID to the request and communicates the request to HA API 28*a* for initiation of order processing. This "communication" may be performed by placing the request in an internal DF engine queue. Message mediator 26*a* may also store the request ID in a second internal queue called a pending queue. HA API 28*a* receives the request (for example, HA API 28*a* may retrieve the request from the DF engine queue) and translates the request for processing by DF engine 22*a* at step 116.

DF engine 22*a* processes the request at step 118 by reviewing the ATP supply and generating a promise that includes a commit date, sourcing location(s), and/or other appropriate information. In connection with generating the promise, DF engine 22*a* may reserve ATP supply for the order and/or change internal allocations of ATP supply. HA API 28*a* communicates a response representing the promise to message mediator 26*a* at step 120. For each promise generated by DF engine 22*a*, HA API 28*a* may communicate a response including at least three components: (1) the promise to be communicated to the external system 40, (2) a replication message for secondary HA systems 20*b*–20*n*, and (3) a persistence message for database system 60. These components may be communicated together or separately to message mediator 26*a* (for example, each component may be communicated in a different packet). The replication message and the persistence message include information that allows secondary HA systems 20*b*–20*n* and database system 60, respectively, to determine what was promised by DF engine 22*a* (or otherwise identify a state change).

At step 122, message mediator 26*a* receives the response from HA API 28*a*, removes the request ID from the response (which was initially attached by message mediator 26*a*), and attaches a transaction ID and time stamp to the response. The transaction ID and time stamp may be attached to each component of the response, if appropriate. Message mediator 26*a* may also perform a search on the pending queue, identify a matching request ID in the queue, and delete the request ID from the queue (to indicate that the request has been processed). Message mediator 26*a* communicates the response to HA server 24*a* at step 124.

At step 126, HA server uses transform library 25*a* to modify the format of the response as appropriate for the particular destination to which the response is to be communicated. For example, transform library 25*a* may modify the promise from DF engine 22 to a format that is appropriate for the destination external system 40. For instance, transform library 25*a* may change the character or line formatting, the type of units used to express certain numerical values (for example, currency type, product amounts, or measurement units), or any other appropriate information. As described above, use of transform library 25*a* may be advantageous since DF engine 22 will not have to be configured to produce a certain type of output for each different external system 40.

Transform libraries 25 may also be used to modify the format of a request from an external system 40 as appropriate for different versions of an APS engine 22. For example, an old version and a new version of an APS engine 22 (in the same or different HA systems 20) may be used to process the same product orders until an administrator is satisfied that the new version is operating properly (the results from the two versions may be compared to ensure proper operation of the new version). In such a situation, a copy of the product order may communicated to each version of the APS engine 22 in a format used by the old version. The transform library 25 associated with the new version may be used to modify incoming requests that are formatted for the old version to account for a different type of formatting required by the new version. Once the old version is replaced by the new version, external systems 40 may be instructed to change the formatting of their requests to comply with the new version or transform libraries 25 may continue to be used to modify the format of incoming requests.

Particular embodiments may also incorporate an engine version number in each incoming request. In such embodiments, an external system 40 (or different external systems 40) may send multiple requests that are each formatted for a different engine version and may specify the version number in the requests. The messages may be directed by message manager 54 or any other appropriate component to the appropriate HA system 20 based on the engine version used by that HA system 20. This use of version numbers may be useful when testing and implementing a new engine version. For example, while the new version is being tested, an external system 40 may be directed to communicate a particular request in a first format appropriate for the new version and in a second format appropriate for the old version. The version number included each the requests may then be used to appropriately direct the requests. Once the new engine version is tested and implemented, the external system 40 may be instructed to only send requests in the first format.

Returning to the exemplary method of FIGS. 2A and 2B, at steps 128*a*–128*c* (which may be performed substantially simultaneously or in any appropriate order), HA server 24*a* communicates the promise to the appropriate gateway 52, communicates the replication message to secondary HA systems 20*b*–20*n*, and communicates the persistence message to database system 60 using message bus 50. Gateway 52 communicates the promise to the appropriate external ordering system 40 at step 130*a*. At step 130*b*, HA systems 20*b*–20*n* process the replication message such that the ATP supply information or other appropriate state information associated with DF engines 22*b*–22*n* is changed to duplicate the state of DF engine 20*a* after processing the order. HA API 28 of each HA system 20*b*–20*n* may initiate the appropriate action by DF engines 22*b*–22*n* to replicate the state of DF engine 22*a*. For example, DF engine 22*a* may modify the ATP supply that may be promised to external systems 40 to reflect a promise of ATP supply generated by DF engine 22*a*. Modification of ATP supply information stored at DF engines 22*b*–22*n* may be in response to information in the replication message and not due to a true re-processing by DF engines 20*b*–20*n* of the product order that was originally communicated to primary HA system 20*a*. This may be referred to as "replaying" the product order. Therefore, the processing power of secondary HA systems 20*b*–20*n* is not unnecessarily used. At step 130*c*, HA server 62 receives the persistence message (which may include information about the product order, the replication performed, and the promise) and communicates the information to database 64 for storage. The exemplary method may be repeated for each product order or other state-changing request generated by an external ordering system 40.

While an exemplary method is illustrated and described, architecture 10 contemplates using any suitable techniques and components for communicating product orders to DF engine 22, processing these orders, communicating responses to external ordering systems 40, and replicating appropriate information. Moreover, certain steps in this method may take place substantially simultaneously and/or in different orders than as described. Architecture 10 also contemplates using other appropriate methods with additional steps, fewer steps, or different steps.

As described above, architecture 10 provides fault protection mechanisms that allow a secondary HA system 20b–20n to replace primary HA system 20a in the event of primary HA system 20a fails or otherwise becomes unavailable. In such an event, the failing primary HA system 20a communicates an alert message to one of the secondary HA engines 20b–20n (HA system 20b in this example). In addition to or instead of such a notification, message manager 54 or any other appropriate component may poll HA systems 20 to determine when an HA system 20 has failed. Message manager 54 may then notify secondary HA system 20b of the failure of primary HA system 20a. Alternatively, HA systems 20 may poll one another. Upon receipt of a failure notification regarding primary HA system 20a or otherwise determining that primary HA system 20a has failed, secondary HA system 20b registers itself with message manager 54 as the new primary HA system 20a causing message manager 54 to direct subsequent state-changing requests to the new primary HA system 20a. Since the previous primary HA system 20a replicated state changing information to the new primary HA system 20a when it was secondary HA system 20b, there is typically no loss of pending requests or inconsistency in state information upon the changeover.

Figure 3:
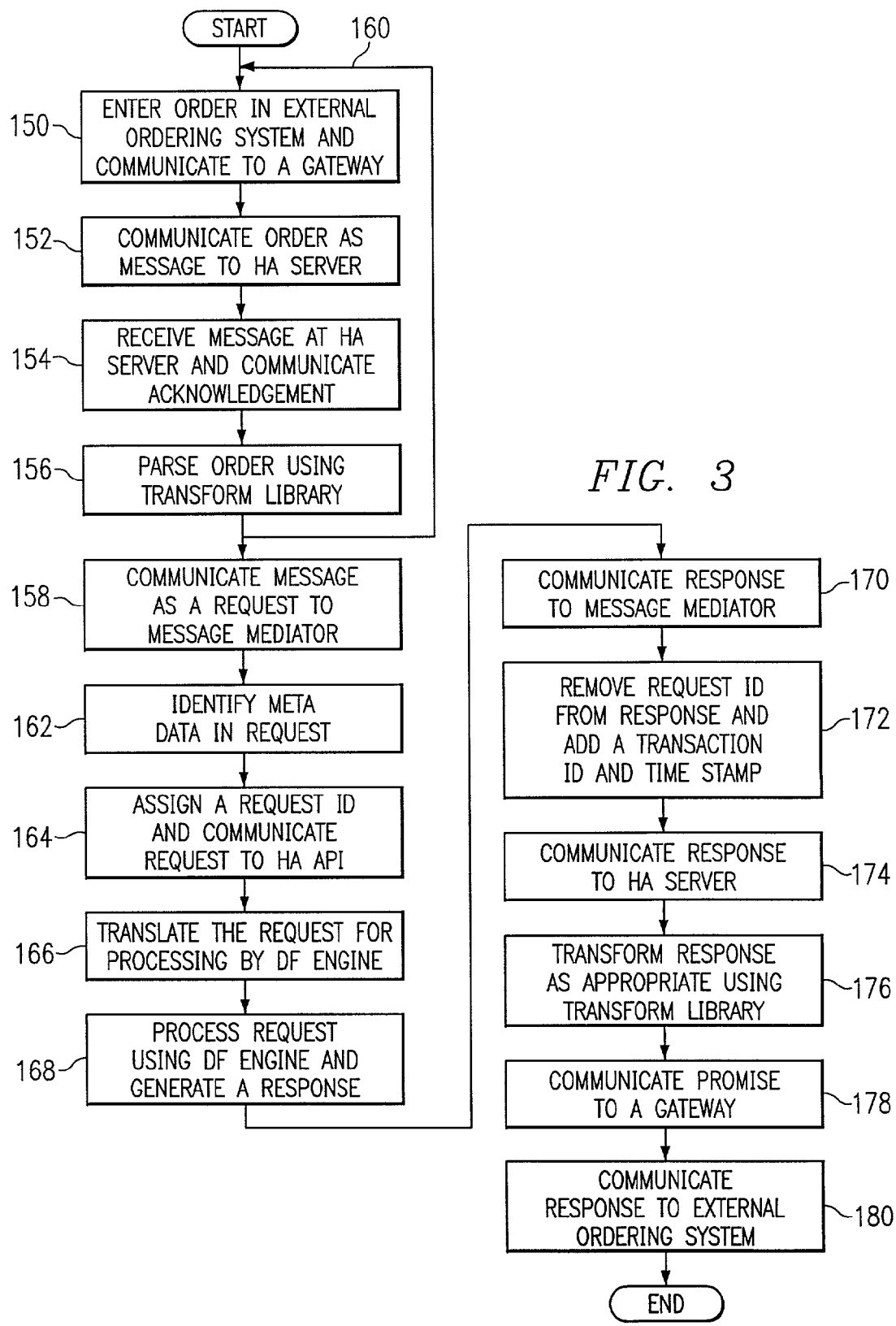
FIG. 3 illustrates an exemplary method of processing product inquiries.

FIG. 3 illustrates an exemplary method of processing product inquiries using architecture 10. The method begins at step 150, where a product inquiry is entered into an order management system 40 and communicated to an appropriate gateway 52. For example, the inquiry may include a query as to whether a particular amount of a product is available for delivery on a particular date. At step 152, gateway 52 communicates the inquiry as a message using message bus 50. As described above, secondary HA systems 20b–20n are preferably used to process nonstate-changing requests, such as product inquiries. Therefore, message manager 54 may direct non-state-changing requests to HA server 24 of any secondary HA system 20b–20n. This frees up primary HA system 20a in embodiments in which primary HA system 20a processes all state-changing requests. However, in other embodiments, any suitable HA system 20 may be used.

Communicating inquiries and other non-state-changing requests to secondary HA systems 20b–20n instead of primary HA system 20a serves to balance the load between the primary HA system 20a and the secondary HA systems 20b–20n. However, at least in one embodiment, primary HA system 20a may also process nonstate-changing requests if appropriate in view of the number of state-changing requests being processed at that time. In addition, message manager 54 may perform load balancing between each of the secondary HA systems 20b–20n by directing each inquiry (or other non-state-changing request) to a particular secondary HA system 20b–20n based on the number of inquiries that are in the request queue of that and possibly each secondary HA system 20b–20n (or based on any other indication of the processing load of that secondary HA system 20b–20n, viewed in isolation or relative to other secondary HA systems 20b–20n). Message manager 54 may communicate with an HA server 24 to determine the number of inquires in its request queue, may communicate with a daemon or other message manager associated with each secondary HA system 20b–20n, or may use any other appropriate method to determine the current load on one or more secondary HA systems 20b–20n. Message manager 54 may then determine at step 152 which secondary HA system 20b–20n has the least amount of load and direct the inquiry to the HA server 24 of that secondary HA system 20b–20n.

At step 154, an appropriate HA server 24 (for example, HA server 24b) receives the request and preferably communicates an acknowledgement to gateway 52 using message bus 50. HA server 24b uses transform library 25b at step 156 to parse the incoming inquiry to examine the inquiry for size and special characters, and communicates the inquiry as a request to message mediator 26b at step 158 (again, the request may be "communicated" by placing the inquiry in an internal request queue). HA server 24b then returns to receive other messages from gateways 52 at step 150, as indicated by arrow 160. At step 162, message mediator 26b retrieves the request from the request queue (or otherwise receives the request) and identifies metadata in the request as described above with reference to FIGS. 2A and 2B. At step 164, message mediator 26b attaches an internal request ID to the request and communicates the request to HA API 28b for initiation of inquiry processing. This "communication" may be performed by placing the request in an internal DF engine queue. Message mediator 26b may also store the request ID in a pending queue. HA API 28b receives the request (for example, HA API 28b may retrieve the request from the DF engine queue) and translates the request for processing by DF engine 22b at step 166.

DF engine 22b processes the request at step 168 by reviewing the ATP supply and generating a response that may include possible commit dates, possible sourcing location(s), and/or other appropriate information. Since the response to the inquiry is not a promise of ATP supply, DF engine 22b does not need to change the ATP supply information. HA API 28b communicates the response to message mediator 26a at step 170. At step 172, message mediator 26b receives the response from HA API 28a, removes the request ID from the response (which was initially attached by message mediator 26a), and attaches a transaction ID and time stamp to the response. Message mediator 26b may also perform a search on the pending queue, identify a matching request ID in the queue, and delete the request ID from the pending queue (to indicate that the request has been processed). Message mediator 26b communicates the response to HA server 24b at step 174. At step 176, HA server 24b uses transform library 25b to modify the format of the response as appropriate for the particular external ordering system 40 to which the response is to be communicated, as described above. At step 178, HA server 24b communicates the response to the appropriate gateway 52 and gateway 52 communicates the response to the appropriate external ordering system 40 at step 180.

While an exemplary method is illustrated and described, architecture 10 contemplates using any suitable techniques and components for communicating product inquiries to DF engine 22, processing these inquiries, and communicating responses to external ordering systems 40. Moreover, certain steps in this method may take place substantially simultaneously and/or in different orders than as described. Architecture 10 also contemplates using other appropriate methods with additional steps, fewer steps, or different steps.

Figure 4:
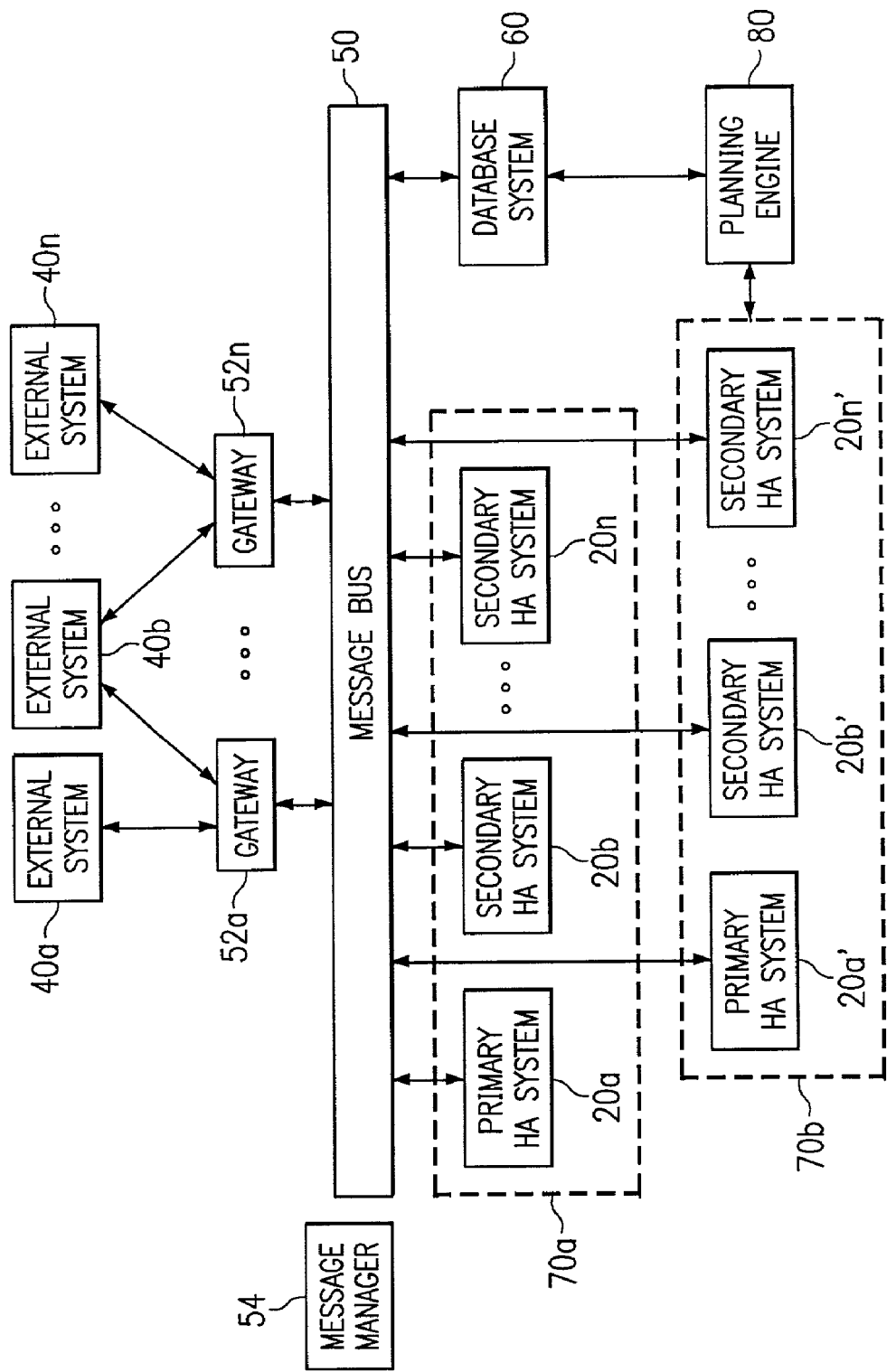
FIG. 4 illustrates an exemplary operating and replacement HA system groups within an exemplary high availability planning and scheduling architecture.

FIG. 4 illustrates an operating HA system group 70a and a replacement HA system group 70b included in architecture 10. Although multiple HA systems 20 and 20' are included in each system group 70, in particular embodiments each system group 70 may only include one HA system 20 or 20'. As described above, ATP supply information and/or other appropriate planning information generated by one or more planning engines 80 may be communicated to the DF engine 22 in each HA system 20 in replacement HA system group

70b before that system group goes on-line to become the operating HA system group 70a. Planning engine 80 may generate such planning information on a periodic or other suitable basis. As an example only, planning engine 80 may perform master demand planning at the end of a day to determine the amount of ATP supply that may be promised by HA systems 20 during the next day (based in part on the amount promised by HA systems 20 during the previous day). When this ATP supply information or other planning information is generated, the information currently stored in memory by HA systems 20 in operating HA system group 70a needs to be updated. Since it is preferable to perform this updating while HA systems 20 in HA system group 70a are off-line, architecture 10 provides a mechanism to allow operating HA system group 70a to be seamlessly replaced by replacement HA system group 70b, which has already received and stored the updated planning information from planning engine 80.

Figure 5:
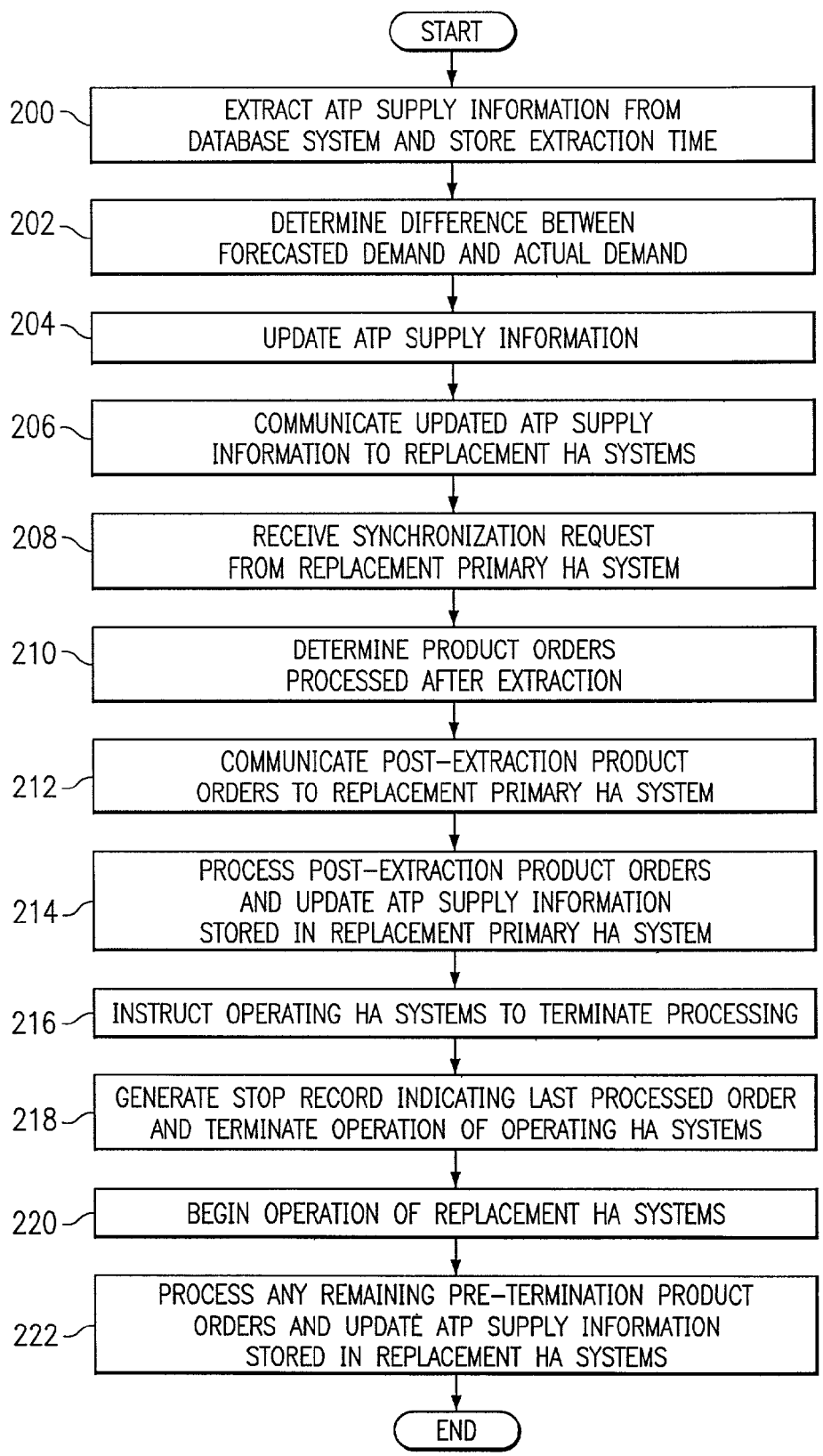
FIG. 5 illustrates an exemplary method of updating and synchronizing planning information between an operating HA system and a replacement HA system.

FIG. 5 illustrates an exemplary method of updating planning information and synchronizing that planning information between an operating HA system 20a and a replacement HA system 20a'. As stated above, although the exemplary method includes the use of planning engine 80 to perform demand planning and to generate ATP supply information for use by DF engines 22, the present invention encompasses the use of any appropriate APS engines in conjunction with any appropriate type of planning activity. The exemplary method begins at step 200, where planning engine 80 extracts change information from database system 60 and/or operating HA system group 70a. The change information may include actual planning information, such as ATP supply information, or information reflecting changes made to the planning information by HA systems 20 over a certain time period. The time at which the extraction takes place is stored in a synchronization table in database 64 or in any other suitable format and/or location. In certain embodiments, planning engine 80 may extract change information associated with subsets of the planning information. For example, planning engine 80 may extract planning information associated with requests for products available from a particular supplier or planning information associated with a particular type of request. In such cases, an extraction time is stored for each subset that is extracted.

At step 202, planning engine 80 determines the difference between the amount of demand forecasted by planning engine 80 and the actual demand for a time period (for example, based on the amount of the ATP supply that was promised during the previous period by HA systems 20 as determined from the change information). Based on this demand information, planning engine 80 updates the amount of ATP supply for the next period at step 204 and communicates the updated ATP supply information to HA systems 20' of replacement HA system group 70b at step 206. Primary HA system 20a of operating HA system group 70a continues to promise ATP supply in response to product orders while the ATP supply information is being updated. Therefore, once replacement HA system group 70b is ready to come on-line, the ATP supply information stored in replacement HA systems 20' should be updated to account for promises made by operating primary HA system 20a after planning engine 80 extracted the ATP supply information.

When replacement HA system group 70b is ready to come on-line, DF engine 22a' of replacement primary HA system 20a' requests a synchronization service from HA server 62 of database system 60 at step 208. HA server 62 determines what product orders were processed by primary HA system 20a after the extraction time ("post-extraction orders") at step 210. HA server 62 may identify the post-extraction orders by determining the extraction time and searching for processed product orders in database 64 (communicated from operating primary HA system 20a) having time stamps indicating that the orders were processed after the extraction. At step 212, HA server 62 communicates the post-extraction product orders (or other suitable information representing the content of the product orders) to replacement primary HA system 20a'.

At step 214, primary HA system 20a' processes or replays the product orders or other appropriate information, as described above in relation to FIGS. 2A and 2B, and updates the ATP supply information stored at primary HA system 20a'. The products orders or other appropriate information may be processed in any suitable manner such that the ATP supply information at primary HA system 20a' is properly updated. Any promises that may be generated by this processing (as described in relation to FIGS. 2A and 2B) are not communicated to external ordering systems 40 since such promises would already have been communicated by operating primary HA system 20a. However, primary HA system 20a' may communicate replication messages to secondary HA systems 20b'–20n' so that these systems may also update their ATP supply information.

Replacement primary HA system 20a' instructs operating HA systems 20 (either individually or through primary HA system 20a) to terminate operation at step 216. At step 218, HA systems 20 terminate operation and generate a stop record indicating the last order that was processed and/or the time of the termination. At substantially the same time as the post-extraction orders are processed by replacement primary HA system 20a' and the termination order is sent, HA systems 20' become operational at step 220 and take over for HA systems 20 (for example, become ready to process product orders, inquiries, and other appropriate requests). It is possible that primary HA system 20a may process a small number of product orders during or after the time that the stop record is published (for example, product orders that were already being processed when primary HA system 20a was instructed to terminate operation). Therefore, at step 222 the new operating primary HA system 20a' may process or replay (as in step 214) any remaining pre-termination orders that were already processed by primary HA system 20a and update the HA supply information in ATP systems 20' accordingly.

While an exemplary method architecture 10 contemplates using any suitable techniques and components for seamlessly replacing an operating HA system group with a replacement HA system group. Moreover, certain steps in this method may take place substantially simultaneously and/or in different orders than as described. Architecture 10 also contemplates using other appropriate methods with additional steps, fewer steps, or different steps.

In summary, the present invention provides an architecture 10 that provides fault tolerant, real-time communication between multiple APS engines 22 and one or more external systems 40. The multiple APS engines 22 interact such that if one APS engine 22 fails or otherwise become unavailable, another APS engine 22 can seamlessly take over for that APS engine 22. Furthermore, the multiple APS engines 22 allow for load balancing through assignment of different types of requests to different APS engines 22 and/or allocation of multiple requests of a particular type between multiple APS engines 22. In addition, requests from external systems 40 may be transformed as appropriate for a particular APS engine 22 and/or a response from an APS engine 22 may be transformed as appropriate for a particular external system 40. Therefore, APS engines and external systems may not need to be specially configured before being included in architecture 10. Moreover, a mechanism may be provided by which the planning information stored in APS engines 22 may be updated while still providing uninterrupted service to external systems 40.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A high availability planning and scheduling system, comprising:
    a plurality of high availability (HA) systems coupled to one or more external systems using a message bus, each HA system including:
        an HA server operable to receive and queue requests received from the external systems; and
        an advanced planning and scheduling (APS) engine operable to:
            receive a request from the HA server;
            process the request using planning information stored in memory of the HA system;
            modify the planning information according to the processing of the request; and
            generate a response to the external system from which the request originated; and
    a message manager operable to direct each request received from an external system to an appropriate HA system using the message bus,
    wherein:
    the plurality of HA systems comprise:
        a first primary HA system operable to process requests requiring modification of the planning information;
        a second primary HA system operable to replace the first primary HA system and process requests requiring modification of the planning information; and
        one or more secondary HA systems operable to process requests not requiring modification of the planning information,
        the second primary HA system further operable to communicate planning information to one or more of the secondary HA systems after replacing the first primary HA system.

2. The system of claim 1, wherein:
    the HA systems are associated with a supplier of products;
    the external systems comprise external ordering systems associated with customers;
    the message bus comprises the Internet;
    the requests comprise product orders from customers;
    the planning information comprises available-to-promise (ATP) supply information associated with one or more products; and
    the APS engine comprises a demand fulfillment engine operable to promise ATP supply to a customer in response to the product orders.

3. The system of claim 1, wherein the HA server in each HA system is further operable to communicate modifications to the planning information made by the associated APS engine to the other HA systems.

4. The system of claim 3, wherein:
    the primary HA system is further operable to communicate information to the secondary HA systems relating to modifications made to the planning information by the APS engine of the primary HA system; and
    each secondary HA system is operable to modify the planning information stored in memory associated with the secondary HA system according to the information received from the primary HA system.

5. The system of claim 3, wherein at least one of the secondary HA systems is operable to become the primary HA system in the event the primary HA system becomes unavailable.

6. The system of claim 3, wherein the message manager is further operable to direct each request not requiring modification of the planning information to a particular one of a plurality of secondary HA systems based at least on the number of requests that are queued in the particular secondary HA system.

7. The system of claim 3, wherein:
    the requests requiring modification of the planning information comprise product orders; and
    the requests not requiring modification of the planning information comprise product inquiries.

8. The system of claim 3, wherein each HA system further comprises a transform library operable to:
    receive the response from the APS engine and modify the response to a format appropriate for the external system for which the response was generated; and
    receive a request from an external system and modify the request to a format appropriate for the APS engine included in the HA system.

9. The system of claim 3, wherein:
    a first HA system includes a first version of the APS engine;
    a second HA system includes a second version of the APS engine;
    each request received from the external systems indicates the version of the APS engine with which the request is associated; and
    the message manager is further operable to communicate each request to either the first HA system or the second HA system based on the version indicated in the request.

10. A method for high availability planning and scheduling, comprising:
    receiving a request received from one or more external systems at a first primary high availability (HA) system using a message bus;
    processing the request using an advanced planning and scheduling (APS) engine and planning information stored in memory of the first primary HA system;
    modifying the planning information according to the processing of the request;
    generating a response to the external system;
    communicating the response to the external system;
    generating a replication message including information reflecting the modifications made to the planning information by the first primary HA system; and
    communicating the replication message to each secondary HA system coupled to the external system using the message bus and operable to process requests from the external system, the secondary HA system further operable to modify a local copy of the planning information stored in memory of the secondary HA system according to the replication message,
    wherein:
    the first primary HA system processes requests requiring modification of the planning information;

the secondary HA system processes requests not requiring modification of the planning information; and the method further comprises:

replacing the first primary HA system with a second primary HA system such that the first primary HA system ceases processing requests from the external systems and the second primary HA system begins processing requests from the external systems: and communicating planning information from the second primary HA system to the secondary HA system after replacing the first primary HA system with the second primary HA system, the secondary HA system operable to store the planning information in memory of the secondary HA system and further operable to begin processing requests using an APS engine included in the secondary HA system and the planning information stored in memory of the secondary HA system.

11. The method of claim 10, further comprising directing requests not requiring modification of the planning information to a particular one of a plurality of secondary HA systems based at least on the number of requests that are queued in the particular secondary HA system.

12. The method of claim 10, wherein:

the requests requiring modification of the planning information comprise product orders; and the requests not requiring modification of the planning information comprise product inquiries.

13. The method of claim 10, further comprising replacing the first primary HA system with the secondary HA system in the event that the first primary HA system becomes unavailable.

14. The method of claim 10, further comprising:

receiving the request and modifying the request to a format appropriate for the APS engine; and receiving the response and modifying the response to a format appropriate for the external system.

15. The method of claim 10, wherein:

the external system comprises an external ordering system associated with customers;

the request comprises product orders from customers;

the planning information comprises available-to-promise (ATP) supply information associated with one or more products; and the APS engine comprises a demand fulfillment engine operable to promise ATP supply to a customer in response to the product orders.

16. High availability planning and scheduling software embodied in a computer-readable medium and operable to:

receive a request received from one or more external systems at a first primary high availability (HA) system using a message bus;

process the request using an advanced planning and scheduling (APS) engine and planning information stored in memory of the first primary HA system;

modify the planning information according to the processing of the request;

generate a response to the external system;

communicate the response to the external system;

generate a replication message including information reflecting the modifications made to the planning information by the first primary HA system;

communicate the replication message to each secondary HA system coupled to the external system using the message bus and operable to process requests from the external system, the secondary HA system further operable to modify a local copy of the planning information stored in memory of the secondary HA system according to the replication message;

direct requests received from external systems and requiring modification of the planning information to the primary HA system;

direct requests received from external systems and not requiring modification of the planning information to the secondary HA system; and replace the first primary HA system with a second primary HA system such that the first primary HA system ceases processing requests from the external systems and the second primary HA system begins processing requests from the external systems; and communicate planning information from the second primary HA system to the secondary HA system after replacing the first primary HA system with the second primary HA system, the secondary HA system operable to store the planning information in memory of the secondary HA system and further operable to begin processing requests using an APS engine included in the secondary HA system and the planning information stored in memory of the secondary HA system.

17. The software of claim 16, further operable to direct requests not requiring modification of the planning information to a particular one of a plurality of secondary HA systems based at least on the number of requests that are queued in the particular secondary HA system.

18. The software of claim 16, wherein:

the requests requiring modification of the planning information comprise product orders; and the requests not requiring modification of the planning information comprise product inquiries.

19. The software of claim 16, further operable to replace the first primary HA system with the secondary HA system in the event that the first primary HA system becomes unavailable.

20. The software of claim 16, further operable to:

receive the request and modify the request to a format appropriate for the APS engine; and receive the response and modify the response to a format appropriate for the external system.

21. The software of claim 16, wherein:

the external system comprises an external ordering system associated with customers;

the request comprises product orders from customers;

the planning information comprises available-to-promise (ATP) supply information associated with one or more products; and the APS engine comprises a demand fulfillment engine operable to promise ATP supply to a customer in response to the product orders.

22. A system for high availability planning and scheduling, comprising:

means for receiving a request received from one or more external systems at a first primary high availability (HA) system using a message bus;

means for processing the request using an advanced planning and scheduling (APS) engine and planning information stored in memory of the first primary HA system;

means for modifying the planning information according to the processing of the request;

means for generating a response to the external system;

means for communicating the response to the external system;

means for generating a replication message including information reflecting the modifications made to the planning information by the first primary HA system; and means for communicating the replication message to each secondary HA system coupled to the external system using the message bus and operable to process requests from the external system, the secondary HA system further operable to modify a local copy of the planning information stored in memory of the secondary HA system according to the replication message, wherein:

the first primary HA system processes requests requiring modification of the planning information;

the secondary HA system processes requests not requiring modification of the planning information; and the system further comprises:

means for replacing the first primary HA system with a second primary HA system such that the first primary HA system ceases processing requests from the external systems and the second primary HA system begins processing requests from the external systems; and means for communicating planning information from the second primary HA system to the secondary HA system after replacing the first primary HA system with the second primary HA system, the secondary HA system operable to store the planning information in memory of the secondary HA system and further operable to begin processing requests using an APS engine included in the secondary HA system and the planning information stored in memory of the secondary HA system.

23. A high availability planning and scheduling system, comprising:

a plurality of high availability (HA) systems associated with a supplier of products and coupled to one or more external ordering systems using a message bus, each HA system including:

an HA server operable to receive and queue requests received from the external systems; and a demand fulfillment engine operable to:

receive a request from the HA server;

process the request using available-to-promise (ATP) supply information associated with one or more products and stored in memory of the HA system;

modify the ATP supply information according to the processing of the request; and generate a response to the external system from which the request originated;

the plurality of HA systems including a first primary HA system operable to process product orders, a second primary HA system operable to replace the first primary HA system and process orders, and one or more secondary HA systems operable to process product inquiries;

the second primary HA system further operable to communicate planning information to one or more of the secondary HA systems after replacing the first primary HA system;

the first primary HA system further operable to communicate information to the secondary HA systems relating to modifications made to the ATP supply information by the APS engine of the first primary HA system resulting from processing of product orders; and each secondary HA system operable to modify the ATP supply information stored in memory associated with the secondary HA system according to the information received from the first primary HA system and further operable to replace the first primary HA system in the event the first primary HA system becomes unavailable.

24. The system of claim 3, wherein the message manager is operable to:

direct requests received from external systems and requiring modification of the planning information to one of the primary HA systems; and direct requests received from external systems and not requiring modification of the planning information to one of the secondary HA systems.

25. The method of claim 10, further comprising:

directing requests received from external systems and requiring modification of the planning information to one of the primary HA systems; and directing requests received from external systems and not requiring modification of the planning information to the secondary HA system.

26. The system of claim 22, further comprising:

means for directing requests received from external systems and requiring modification of the planning information to one of the primary HA systems; and means for directing requests received from external systems and not requiring modification of the planning information to the secondary HA system.

27. The system of claim 22, further comprising a message manager operable to:

direct product orders to one of the primary HA systems; and direct product inquiries to one of the secondary HA systems.

* * * * *